(12) United States Patent
Koli et al.

(10) Patent No.: US 10,635,330 B1
(45) Date of Patent: Apr. 28, 2020

(54) TECHNIQUES FOR SPLITTING UP I/O COMMANDS IN A DATA STORAGE SYSTEM

(71) Applicant: EMC IP Holding Company LLC, Hopkinton, MA (US)

(72) Inventors: Milind M. Koli, Morrisville, NC (US); Timothy C. Ng, Cary, NC (US); Xiangqing Yang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 349 days.

(21) Appl. No.: 15/394,422

(22) Filed: Dec. 29, 2016

(51) Int. Cl.
*G06F 12/02* (2006.01)
*G06F 3/06* (2006.01)

(52) U.S. Cl.
CPC .......... *G06F 3/0619* (2013.01); *G06F 3/0665* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 7,099,900 B1 * | 8/2006 | Bromley | G06F 11/1451 707/652 |
| 8,442,952 B1 * | 5/2013 | Armangau | G06F 16/1752 707/686 |
| 9,122,689 B1 | 9/2015 | Bono et al. | |
| 9,229,656 B1 | 1/2016 | Contreras et al. | |
| 9,594,795 B1 | 3/2017 | Koli et al. | |
| 9,612,756 B1 | 4/2017 | Koli et al. | |
| 9,830,105 B1 | 11/2017 | Tummala et al. | |
| 9,916,244 B1 | 3/2018 | Tolvanen et al. | |
| 2003/0070111 A1 * | 4/2003 | Riley | G06F 11/10 714/5.1 |
| 2008/0052455 A1 * | 2/2008 | Ahmadian | G06F 3/0605 711/112 |

(Continued)

OTHER PUBLICATIONS

Lili Chen et al.; "Zero on Demand Operations Based on Zeroed Chunk Tables of Storage Drive Objects Stored in Main Memory," U.S. Appl. No. 14/750,441, filed Jun. 25, 2015.

(Continued)

*Primary Examiner* — Charles Rones
*Assistant Examiner* — Ryan Dare
(74) *Attorney, Agent, or Firm* — BainwoodHuang (57) ABSTRACT

A method performed by a mapping driver executing on a DSS includes (a) receiving a data storage command that identifies a portion of storage of the DSS having a given size to which the data storage command is directed, (b) generating a plurality of derived data storage (DDS) instructions from the received data storage command, each DDS instruction of the plurality of DDS instructions identifying a respective sub-portion of the portion to which that DDS instruction is directed, each sub-portion having a respective sub-portion size smaller than the given size, and (c) issuing each DDS instruction separately to a data storage coordination driver also executing on the DSS, the data storage coordination driver being configured to cause each DDS instruction to be performed with respect to storage of the DSS. An apparatus, system, and computer program product for performing a similar method are also provided.

20 Claims, 5 Drawing Sheets

(56) References Cited

U.S. PATENT DOCUMENTS

| | | | | |
|---|---|---|---|---|
| 2015/0169465 A1* | 6/2015 | Slepon | ............... | G06F 12/1009 |
| | | | | 711/103 |
| 2016/0147607 A1* | 5/2016 | Dornemann | ........ | G06F 11/1435 |
| | | | | 711/162 |
| 2016/0239323 A1* | 8/2016 | Tsirkin | ............... | G06F 9/45558 |
| 2016/0299724 A1* | 10/2016 | Vanaraj | ............... | G06F 11/1076 |
| 2018/0173461 A1* | 6/2018 | Carroll | ................. | G06F 3/0659 |

OTHER PUBLICATIONS

Alan L. Taylor et al.; "Managing Data Storage Migration for Virtual Machines," U.S. Appl. No. 14/754,961, filed Jun. 30, 2015.

Saar Cohen et al.; "Non-Disruptively Migrating Virtual Disks Using Virtualization Appliance," U.S. Appl. No. 14/984,219, filed Dec. 30, 2015.

Yossef Saad et al.; "Storage Performance Testing to Evaluate Moving Data Among Arrays," U.S. Appl. No. 14/980,501, filed Dec. 28, 2015.

Milind M. Koli et al.; "Data Storage System With Dynamic Throttling of Parellel Sub-I/O Requests for Individual Host I/O Requests," U.S. Appl. No. 14/972,418, filed Dec. 17, 2015.

Milind M. Koli et al.; "Data Storage System With Efficient Processing of Single Mapping Callback for Host I/O Requests," U.S. Appl. No. 14/972,421, filed Dec. 17, 2015.

Milind M. Koli et al.; "Pairing of Data Storage Requests," U.S. Appl. No. 15/199,166, filed Jun. 30, 2016.

Milind M. Koli et al.; "Techniques for Performing Data Storage Copy Operations in an Integrated Manner," U.S. Appl. No. 15/199,192, filed Jun. 30, 2016.

Alan L. Taylor et al.; "Efficient Cloning and Migration of Data Objects," U.S. Appl. No. 15/281,963, filed Sep. 30, 2016.

Milind M. Koli et al.; "Techniques for Migrating Toa Thinly-Provisioned Logical Disk Without Writing Zero Blocks," U.S. Appl. No. 15/389,124, filed Dec. 22, 2016.

* cited by examiner

TECHNIQUES FOR SPLITTING UP I/O COMMANDS IN A DATA STORAGE SYSTEM

BACKGROUND

Data storage systems (DSSes) are integrated systems that allow persistent data storage to be presented to remote host devices in an efficient manner. A host may transmit data storage commands to the DSS for processing. A DSS may be configured as one or more storage processors attached to underlying persistent storage, each storage processor being configured to process data storage commands.

Data of a DSS may be organized into logical disks. These logical disks may be provisioned with backing store. In some systems, specialized tracking data structures are used to keep track of discrete extents of backing store underlying the portion of a logical disk to which an Input/Output (I/O) command is directed. Because only a fixed number of tracking data structures may be provisioned within the DSS for use in processing I/O commands, the DSS may enforce a maximum permitted size of an I/O.

SUMMARY

Unfortunately, the above-described techniques may suffer from deficiencies. For example, if a host device wishes to initiate an I/O on the DSS, if the I/O exceeds the maximum permitted size, the I/O will fail, which is inefficient. In addition, even if the host knows about the maximum permitted size in advance, the host will need to issue the I/O as several smaller I/O requests, which adds processing complexity to the host.

These deficiencies can be exacerbated when the DSS uses a finer granularity for storing data. For example, a typical modern DSS uses a block size of 8 kilobytes. Thus, since it is possible that contiguous blocks of a logical disk may be backed by non-contiguous blocks within backing store, the maximum permitted size of an I/O is limited, to account for the worst-case scenario, by the fixed number of provisioned tracking data structures multiplied by 8 kilobytes. Thus, in a DSS having 8,192 provisioned tracking data structures and 8-kilobyte blocks, the maximum permitted size of an I/O may be set to 64 megabytes (or, if two I/Os are allowed at once, 32 megabytes). However, if a cache is used in which individual 512-byte sectors of any given block of a logical disk may be updated and stored separately within cache, for example, the granularity of the DSS decreases to 512 bytes, which can reduce the maximum permitted size of an I/O by a factor of 16. Thus, the maximum permitted size of an I/O may be reduced to only 4 megabytes or less.

Although, in principle, it may be possible to provision a DSS with more tracking data structures, limited memory resources and/or legacy structural limitations may make it undesirable to increase the number of provisioned tracking data structures. In addition, no matter how many tracking data structures are provisioned, there will still be some maximum permitted I/O size.

Thus, it would be desirable to implement a DSS that is able to accept any sized I/O regardless of its size and regardless of the number of tracking data structures provisioned. This may be accomplished by configuring a mapping driver of the DSS to split up incoming I/Os into smaller constituent parts, and only internally issue the smaller constituent parts for fulfillment using the tracking data structures. Thus, a large I/O may be processed internally as several smaller I/Os, none of which will individually exceed the fixed number of provisioned tracking data structures. If these are processed sequentially (or with only a fixed number at once in parallel), any indefinitely large I/O can be processed without exceeding the fixed number of provisioned tracking data structures needed. Advantageously, no maximum I/O size is needed due to a DSS having only a fixed number of provisioned tracking data structures. In addition, these techniques can also be used to enhance operation of misaligned zero-fill commands targeted at thinly-provisioned logical disks by breaking up any misaligned zero-fill command into only two or three smaller operations, including an efficient deallocation of the aligned portion of the zero-fill command.

In one embodiment, a method is performed by a DSS. The method includes (a) receiving, by a mapping driver executing on the DSS device, a data storage command, the data storage command identifying a portion of storage of the DSS device having a given size to which the data storage command is directed, (b) generating, by the mapping driver executing on the DSS device, a plurality of derived data storage instructions from the received data storage command, each derived data storage instruction of the plurality of derived data storage instructions identifying a respective sub-portion of the portion of storage to which that derived data storage instruction is directed, each sub-portion having a respective sub-portion size smaller than the given size, and (c) issuing, by the mapping driver executing on the DSS device, each derived data storage instruction of the set of derived data storage instructions separately to a data storage coordination driver also executing on the DSS device, the data storage coordination driver being configured to cause each derived data storage instruction to be performed with respect to storage of the DSS device. An apparatus, system, and computer program product for performing a similar method are also provided.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

DETAILED DESCRIPTION

Embodiments are directed to techniques for implementing a data storage system (DSS) that is able to accept any sized Input/Output operation (I/O) regardless of its size and regardless of the number of tracking data structures provisioned. This may be accomplished by configuring a mapping driver of the DSS to split up incoming I/Os into smaller constituent parts, and only internally issue the smaller constituent parts for fulfillment using the tracking data structures. Thus, a large I/O may be processed internally as several smaller I/Os, none of which will individually exceed the fixed number of provisioned tracking data structures. If these are processed sequentially (or with only a fixed number at once in parallel), any indefinitely large I/O can be processed without exceeding the fixed number of provisioned tracking data structures needed. Advantageously, no maximum I/O size is needed due to a DSS having only a fixed number of provisioned tracking data structures. In addition, these techniques can also be used to enhance operation of misaligned zero-fill commands targeted at thinly-provisioned logical disks by breaking up any misaligned zero-fill command into only two or three smaller operations, including an efficient deallocation of the aligned portion of the zero-fill command.

Figure 1:
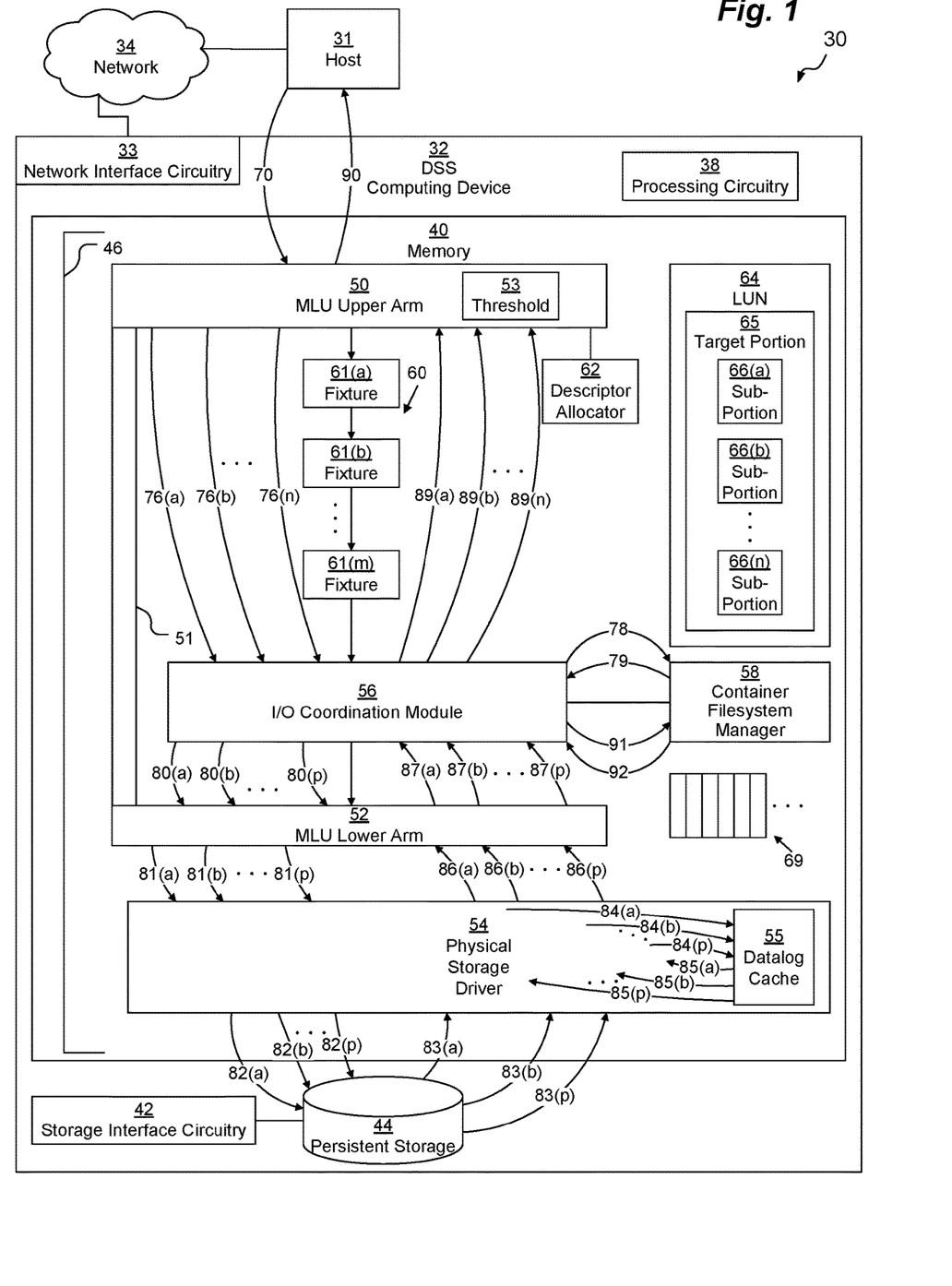
FIG. 1 is a block diagram depicting an example system and apparatus for use in connection with various embodiments.

FIG. 1 depicts a system 30. System 30 includes a computing device 32 serving as a DSS, a network 34, and one or more hosts 31 that may serve as initiators of commands to the DSS computing device 32 over the network 34. In some embodiments, system 30 may also include one or more other DSSes (not depicted).

Computing device 32 may be any kind of computing device, such as, for example, a personal computer, workstation, server computer, enterprise server, DSS rack server, laptop computer, tablet computes, smart phone, mobile computer, etc. Typically, computing device 32 is a DSS rack server.

Host 31 may be any kind of computing device capable of sending data storage commands to computing device 32 over network 34, such as, for example, a personal computer, workstation, server computer, enterprise server, laptop computer, tablet computes, smart phone, mobile computer, etc. Typically, host 31 is a workstation, server computer, or enterprise server. In some embodiments, host 31 may run a hypervisor (not depicted), allowing various virtual machines (not depicted) to execute in a virtualized environment (not depicted) thereon.

The network 34 may be any type of network or combination of networks, such as a storage area network (SAN), a local area network (LAN), a wide area network (WAN), the Internet, and/or some other type of network or combination of networks, for example. The hosts 31 and DSS computing device 32 may connect to the network 34 using various technologies, such as Fibre Channel (FC), iSCSI, NFS, SMB 3.0, and CIFS, for example. Any number of hosts 31 and DSSes 32 may be provided, using any of the above protocols, some subset thereof, or other protocols besides those shown.

DSS computing device 32 includes network interface circuitry 33, processing circuitry 38, storage interface circuitry 42, persistent data storage 44, and memory 40. DSS computing device 32 may also include other components as are well-known in the art, including interconnection circuitry, for example.

Network interface circuitry 33 may include one or more Ethernet cards, cellular modems, FC adapters, Wireless Fidelity (Wi-Fi) wireless networking adapters, and/or other devices for connecting to network 34. Processing circuitry 38 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Persistent storage 44 may include any kind of persistent storage devices, such as, for example, hard disk drives, solid-state storage devices, flash drives, etc. Storage interface circuitry 42 controls and provides access to persistent storage 44. Storage interface circuitry 42 may include, for example, SCSI, SAS, ATA, SATA, Fibre Channel (FC), and/or other similar controllers and ports. Persistent storage 44 may be arranged in various configurations, such as, for example in RAID groups that provide storage striped or mirrored across several disks (with optional parity data, e.g., in RAID-5) as RAID disks. In some embodiments, each RAID disk may be subdivided into Flare LUNs, which may themselves be subdivided into slices (not depicted) of, for example, 256 MB or 1 gigabyte size. These slices may be assigned as backing store to a container filesystem manager 58 (e.g., the Common Block Filesystem provided by EMC Corp. of Hopkinton, Mass.). Container filesystem manager 58 manages one or more files backed by these slices in a mapped manner, and a mapping driver 51 is then able to present one or more of these files to hosts 31 as one or more respective logical disks, such as a logical unit (LUN) 64, which is a type of logical disk. In other embodiments, one or more of the logical disks 64 presented by the mapping driver 51 are used as volumes on which an upper-deck filesystem (not depicted) is stored. In these embodiments, these upper-deck filesystems are presented to hosts 31 rather than the underlying logical disks.

Memory 40 may be any kind of digital system memory, such as, for example, random access memory (RAM). Memory 40 stores one or more operating systems (OSes) in operation (e.g., Linux, UNIX, Windows, MacOS, or a similar operating system; not depicted), various applications (not depicted) executing on processing circuitry 38, and various drivers 51, 54, 56, 61, 62 (and their respective subcomponents) some of which may be arranged in a driver stack 46 or a fixture stack 60. Memory 40 also includes a container filesystem manager 58 in operation.

In some embodiments, memory 40 may also include a persistent storage portion (not depicted). Persistent storage portion of memory 40 may be made up of one or more persistent storage devices, such as, for example, disks. Persistent storage portion of memory 40 or persistent storage 44 is configured to store programs and data even while the DSS computing device 32 is powered off. The OS and the applications are typically stored in this persistent storage portion of memory 40 or in persistent storage 44 so that they may be loaded into a system portion of memory 40 from this persistent storage portion of memory 40 or persistent storage 44 upon a system restart. These applications and drivers 50, 51, 52, 54, 56, 58, 61, 62 when stored in non-transient form either in the volatile portion of memory 40 or in persistent storage 44 or in persistent portion of memory 40, form a computer program product. The processing circuitry 38 running one or more of these applications or drivers 50, 51, 52, 54, 56, 58, 61, 62 thus forms a specialized circuit constructed and arranged to carry out the various processes described herein.

Memory 40 stores at least two drivers 51, 54 that operate as part of storage driver stack 46. Driver stack 46 includes mapping driver 51 (also referred to as the MLU). At the bottom of the driver stack 46 is a physical storage driver 54 that is able to communicate with the storage interface circuitry 42, providing the MLU 51 with access to the individual slices, FLUs, and RAID disks of persistent storage 44. Physical storage driver 54 may also include a datalog cache 55 to allow data to be written quickly without the need to allocate backing store right away. In some embodiments there may be additional drivers (not depicted) within driver stack 46 above and/or below the MLU 51.

MLU 51 is a multi-part driver having an upper arm 50 and a lower arm 52. In addition, MLU 51 is arranged in a "C-Clamp" configuration, allowing it to communicate with various other software modules without using inter-driver communication. A fixture stack 60 includes a stack of fixture modules 61 (depicted as fixtures 61(a), . . . , 61(m)). I/O Coordination module 56 sits at the bottom of the fixture stack 60. Upper arm 50 is able to send I/O descriptors 76, which it obtains from descriptor allocator module 62, down the fixture stack 60 towards the lower arm 52. This allows the various fixtures 61 and I/O Coordination module 56 to make various changes and translations to storage operations prior to final processing by the lower arm 52 of the MLU 51. Fixtures 61 typically perform services ancillary to storage. An example fixture 61 is a compression module, while another example fixture is a de-duplication module.

In operation, host 31 (or, in some embodiments, a driver operating on DSS computing device 32) sends an I/O command 70 to read or write from or to a target portion 65 of LUN 64 on the DSS computing device 32. Target portion 65 typically includes one or more blocks (or, in some embodiments, one or more sectors), which are backed by backing store drawn from a slice of physical storage 44 or drawn from datalog cache 55. I/O command 70 may be, for example, a write command, a read command, or a zero-fill command. I/O command 70 may be an inter-driver communication taking the form of an I/O Request Packet (IRP) holding an IOCTL or DeviceIoControl system call as is well-known in the art.

In order to fulfill the I/O command 70, upper arm 50 creates (e.g., by calling descriptor allocator 62) a set of I/O descriptor data structures (IODs) 76 (depicted as IODs 76(a), 76(b), . . . , 76(n)) and sends them down the fixture stack 60 to the I/O Coordination module 56. In one embodiment, an IOD 76 has a stacked data structure with a public field at the top and a set of private fields that hold data specific to specific fixtures 61 in the fixture stack 60. In addition, there may be shared fields between the private fields that allow adjacent fixtures 61 to pass information from one to the next.

In one embodiment, if the I/O command 70 is a read command and the size of the target portion 65 as defined by the I/O command 70 exceeds a threshold size 53, then the set of IODs 76 will include a plurality of IODs 76, each representing a read I/O of a respective sub-portion 66 (depicted as sub-portions 66(a), 66(b), . . . , 66(n)) of the target portion 65 on LUN 64. In some embodiments, the set will also include a plurality of IODs 76 if the I/O command 70 is a write command and the size of the target portion 65 as defined by the I/O command 70 exceeds the threshold size 53; in that case, each IOD 76 represents a write I/O of a respective sub-portion 66 of the target portion 65 on LUN 64. In some embodiments, if the I/O command 70 is a zero-fill command and it is misaligned (i.e., not aligned to block boundaries on either end), then the set of IODs 76 will include a plurality of IODs 76 (e.g., either two or three IODs 76), each representing an I/O of a respective sub-portion 66 of the target portion 65 on LUN 64 (e.g., in a case in which the target portion 65 is misaligned to block boundaries on both ends, IOD 76(a) represents a write I/O of all zeroes to sub-portion 66(a) covering the part of a first block of target portion 65 that is within target portion 65, IOD 76(b) represents a deallocation I/O of all blocks of sub-portion 66(b) covering all blocks of target portion 65 that are entirely within target portion 65, and IOD 76(n) represents a write I/O of all zeroes to sub-portion 66(n) covering the part of a last block of target portion 65 that is within target portion 65).

A private field of each IOD 76 associated with the I/O Coordination module 56 typically holds an I/O tracking structure (IOTS) (see FIG. 2, below), which stores information about the sub-portion 66 assigned to that IOD 76 as well as other information allowing its I/O to be tracked.

I/O Coordination module 56, upon receiving each IOD 76, processes that IOD 76. I/O coordination module 56 serves to coordinate storage-related operations between the MLU 51 and the container filesystem manager 58. Thus, when the received IOD 76 represents a read I/O or a write I/O, I/O coordination module 56 sends a Map_for_Read or Map_for_Write command 78 (as appropriate) to container filesystem manager 58 in order to obtain a mapping response 79.

In the case of a read I/O, a set of extent descriptors is returned as the mapping response 79 to a Map_for_Read command 78. Each extent descriptor represents a contiguous extent of backing store (on either persistent storage 44 or datalog cache 55) that represents a contiguous sub-sub-portion of the sub-portion 66 identified by the IOD 76 received by the I/O coordination module 56.

In the case of a write I/O, a disparate write buffer is returned as the mapping response 79 to a Map_for_Write command 78. The disparate write buffer contains a mapping of the logical locations of the blocks in LUN 64 to physical locations within persistent storage 44 or within datalog cache 55. This disparate write buffer may take the form of a set of extent descriptors.

In the case of a read or write I/O, I/O Coordination module 56 sends a set of read or write I/O instructions 80 (depicted as I/O instructions 80(a), 80(b), . . . , 80(p)) down to lower arm 52. In the case of a read I/O, a separate I/O instruction 80 is sent for each extent descriptor of the set of extent descriptors received as mapping response 79. In the case of a write I/O, in some embodiments, a separate I/O instruction 80 may be sent for each extent descriptor of received disparate write buffer. In other embodiments, in the case of a write I/O, a single I/O instruction 80 is sent covering all extent descriptors of the received disparate write buffer. In some of these embodiments, the I/O instruction 80 includes the disparate write buffer, while in other of these embodiments, the write instruction 80 includes a pointer to the disparate write buffer.

Each I/O instruction 80 includes its own respective Sub-I/O Tracking Structure (SIOTS) 69. A fixed number of SIOTSes 69 (e.g., 8,192) are typically provisioned from memory 40. A SIOTS 69 is used to transfer information about an extent between modules 56, 52, 54, 55, 44 and to track completion of the respective I/Os.

Lower arm 52 is then able to use this information to send a set of inter-driver I/O commands 81 (depicted as inter-driver I/O commands 81(a), 81(b), . . . , 81(p)) down the driver stack 46 to the physical driver 54. Inter-driver I/O commands 81 may take the form of an IRP holding an IOCTL or DeviceIoControl system call. In some embodiments, one inter-driver I/O command 81 may include write commands for several extents from the disparate write buffer. In other embodiments, lower arm 52 issues a separate inter-driver write command 81 for each such extent.

In response, physical storage driver 54 performs the one or more inter-driver I/O commands 81 by either (A) sending a respective low-level I/O command 82 (depicted as low-level I/O commands 82(a), 82(b), . . . , 82(p)) to persistent storage 44, receiving a low-level I/O response 83 (depicted as low-level I/O responses 83(a), 83(b), . . . , 83(p)) in response, or (B) sending a respective cached I/O command 84 (depicted as cached I/O commands 84(a), 84(b), . . . , 84(p)) to datalog cache 55, receiving a cached I/O response 85 (depicted as cached I/O responses 85(a), 85(b), . . . , 85(p)) in response.

Then, physical storage driver 54 is able to issue a response 86 (depicted as responses 86(a), 86(b), . . . , 86(p)) for each inter-driver I/O command 81 back to the lower arm 52, which, in turn sends a response 87 (depicted as responses 87(a), 87(b), . . . , 87(p)) up to the I/O Coordination module 56. I/O Coordination module 56 may then repeat for each remaining identified allocated physical extent.

When the received IOD 76 represents a deallocation I/O, because a deallocation I/O does not require any writes to be performed by the physical storage driver 54, I/O coordination module 56 coordinates with container filesystem manager 58 to deallocate (or confirm deallocation of) blocks within LUN 64. Thus, I/O coordination module 56 sends a Map_for_Deallocate command 91 to container filesystem manager 58. In response, container filesystem manager 58 deallocates backing store for the blocks of the sub-portion 66 identified by the received deallocation IOD 76 and sends back a Map_for_Deallocate response 92. In some embodiments, this is followed by a commit command and response.

Then, in any case (read I/O, write I/O, deallocation I/O), I/O coordination module 56 sends a completion signal 89 (which may take the same form as IOD 76, but with a success marker) up the fixture stack 60 to upper arm 50.

Upon completion of each IOD 76(x) (and receipt of the corresponding completion signal 89(x)), upper arm 50 sends the next IOD 76(x+1) down the fixture stack 60 for fulfillment until all IODs 76 have been fulfilled.

Upper arm 50 may then send a completion signal 90 (which may take the form of an IRP) back to host 31.

Figure 2:
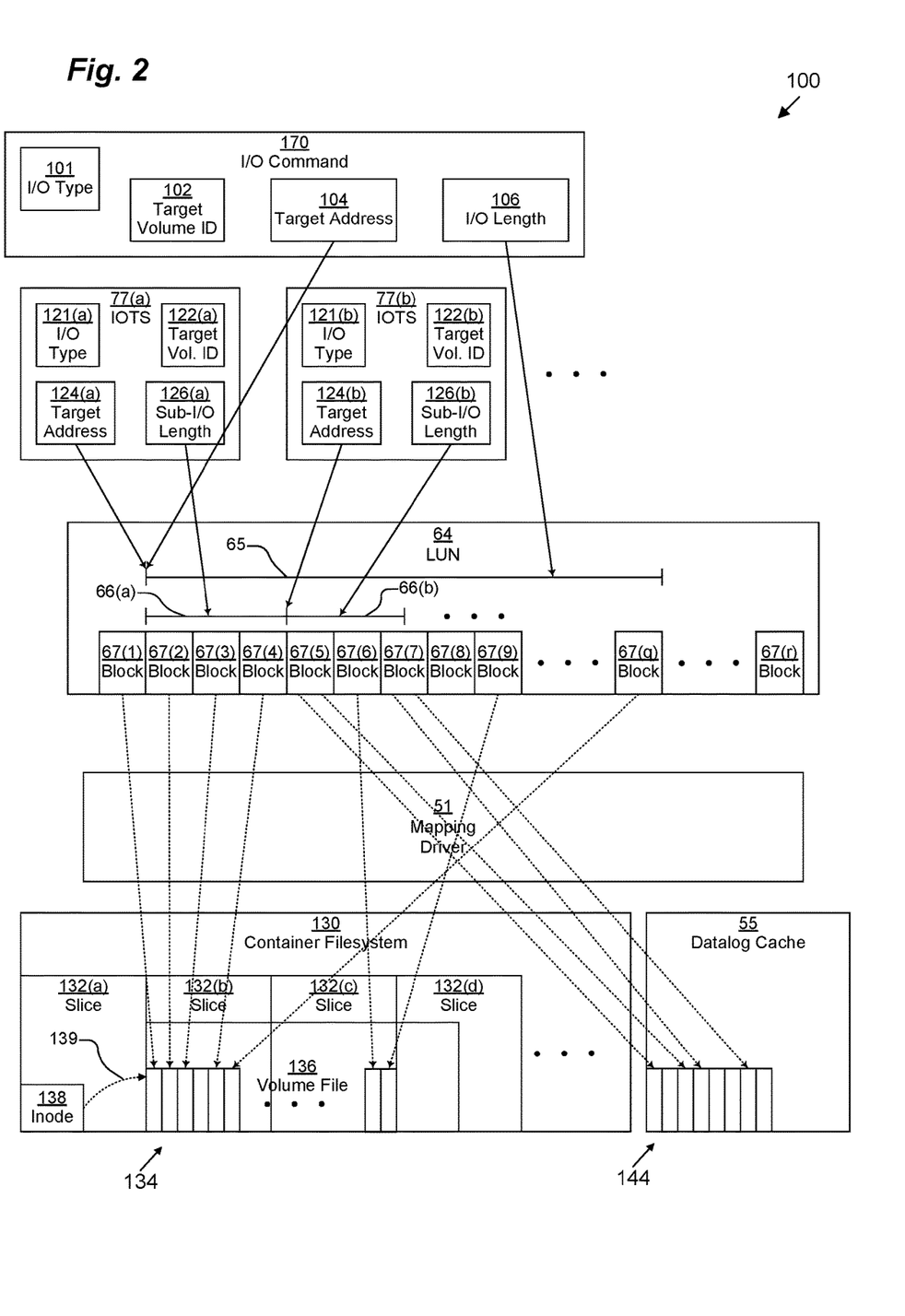
FIG. 2 is a block diagram depicting an example relationship between data structures for use in connection with various embodiments.

FIG. 2 illustrates an example arrangement 100 of LUN 64, its mapping to backing store on container filesystem 130 provided by persistent storage 44 and datalog cache 55, and a portion 65 identified by an example I/O command 170 and its sub-portions 66.

LUN 64 is made up of a set of data blocks 67 (depicted as data blocks 67(1), 67(2), 67(3), 67(4), 67(5), 67(6), 67(7), 67(8), 67(9), . . . , 67(q), . . . , 67(r)).

An example I/O command 170 has an I/O type 101 (e.g., a read), a target volume identifier 102 (e.g., pointing to LUN 64), a target address 104 (e.g., the start of block 67(2)), and an I/O length 106 (e.g., q−1 blocks). The target volume identifier 102, target address 104, and I/O length 106 define target portion 65 associated with the I/O command 70.

Since example I/O command 170 is a read command, if q−1 exceeds the threshold 53, then upper arm 50 will divide it into component IODs 76, each IOD 76 relating to a respective sub-portion 66 of the target portion 65. Although the IODs 76 are not depicted in FIG. 2, each IOD 76 has a respective IOTS 77. Each IOTs 77 has a respective I/O type 121, a target volume identifier 122, a target address 124, and a sub-I/O length 126.

For a typical read or write command, the I/O type 121(x) and target volume identifier 122(x) of a given IOTS 77(x) are the same as the I/O type 101 and target volume identifier 102 of the parent I/O command 70.

Thus, IOTS 77(a) has a I/O type 121(a) of write, a target volume identifier 122(a) of LUN 64, a target address 124(a) of the beginning of block 67(2), and a sub-I/O length 126(a) of 3 blocks, defining a first sub-portion 66(a).

IOTS 77(b) has a I/O type 121(b) of write, a target volume identifier 122(b) of LUN 64, a target address 124(b) of the beginning of block 67(5), and a sub-I/O length 126(b) of five sectors, defining a first sub-portion 66(a). In the example of FIG. 2, for simplicity, even though a block 67 is normally 8 kilobytes long, each block 67 is depicted as being 1 kilobyte long and is made up of two 512-byte sectors.

Each non-zero data block 67 of LUN 64 is backed by either a block 134 on a container filesystem 130 or a set of sectors 144 from datalog cache 55, as mapped by MLU 51. Container filesystem 130 is provisioned with slices 132 (depicted as slices 132(a), 132(b), 132(c), 132(d), . . . ) from persistent storage 44 by container filesystem manager 58. Each slice 132 is subdivided into blocks 134 (e.g., 1 kilobyte each, as depicted). A volume file 136 made up of blocks 134 maps to LUN 64 as part of its backing store. An inode 138 (and its associated indirect blocks as is well-known in the art) may define which blocks 134 are part of the volume file 136 through a set of pointers 139. Thus, some non-zero data blocks 67 of LUN 64 are backed by blocks 134 (e.g., blocks 67(1), 67(2), 67(3), 67(4) are backed by blocks 134 on slice 132(b), and blocks 67(6), 67(9) are backed by blocks 134 on slice 132(c)). As depicted, contiguous blocks 67 within the address space of LUN 64 may not necessarily map to contiguous blocks 134 within the address space of container filesystem 130.

Similarly, certain blocks 67 (e.g., blocks 67(5), 67(7)) of LUN 64 are backed instead by sectors 144 (e.g., 512 bytes each) of datalog cache 55. As depicted, contiguous blocks 67 within the address space of LUN 64 may not necessarily map to contiguous sectors 144 within the address space of datalog cache 55.

Certain blocks 67 (e.g., blocks 67(8), 67(r)) are not backed by any backing store at all. These are empty blocks 67 with all zeroes.

Figure 3:
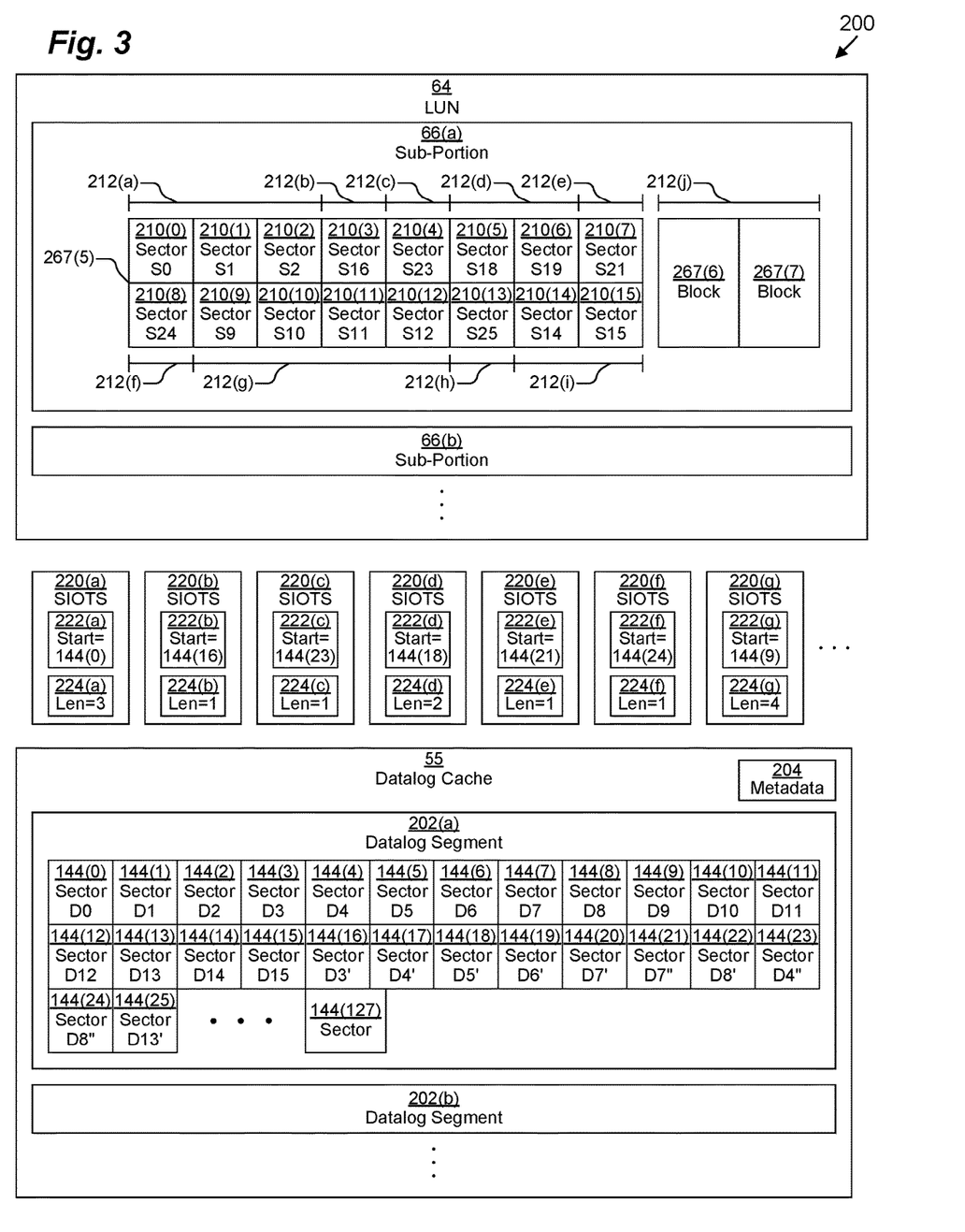
FIG. 3 is a block diagram depicting an example relationship between data structures for use in connection with various embodiments.

FIG. 3 illustrates an example arrangement 200 of LUN 64 and how a sub-portion 66 thereof maps to backing store on datalog cache 55 using a set of SIOTSes 220.

Example LUN 64 is made up of a set of data blocks 267 (only some of which are depicted as data blocks 267(5), 267(6), 267(7)). Data blocks 267(5), 267(6), 267(7) make up a first sub-portion 66(a) of a target portion 65 (see FIG. 1) of LUN 64, the target portion 65 having been defined by an I/O command 70 (see FIG. 1). LUN 64 also contains additional sub-portions 66(b), . . . . The first sub-portion 66(a) is defined by an IOTS 77 (see FIG. 2) of an IOD 76(a) created by upper arm 50 (see FIG. 1).

As depicted in FIG. 3, each block 267 of LUN 64 is made up of sixteen sectors 210 (depicted as sectors 210(0)-210(15)). In one embodiment, a sector 210 is 512 bytes and a block 267 is 8 kilobytes in size.

Some blocks 267 within sub-portion 66(a) may be backed by blocks 134 of volume file 130 on slices 132 (see FIG. 2) from persistent storage 44 (see FIG. 1). Other blocks 267 (e.g., block 267(5)) are backed by sectors 144 stored in memory 40 (see FIG. 1) within datalog cache 55. It is also possible (not depicted) for a block 267 to be backed by a block 134, but for an individual sector 210 on that block 267 to override that and be backed by a sector 144 from datalog cache 55.

As depicted, sector 210(0) is in position #0 of block 267(5) and it is backed by sector 144(0) (as indicated in the diagram by the S0 notation) of datalog cache 55. Sector 210(1) is in position #1 of block 267(5) and it is backed by sector 144(1) (as indicated in the diagram by the S1 notation) of datalog cache 55. Sector 210(2) is in position #2 of block 267(5) and it is backed by sector 144(2) (as indicated in the diagram by the S2 notation) of datalog cache 55. Sector 210(3) is in position #3 of block 267(5) and it is backed by sector 144(16) (as indicated in the diagram by the S16 notation) of datalog cache 55. Sector 210(4) is in position #4 of block 267(5) and it is backed by sector 144(23) (as indicated in the diagram by the S23 notation) of datalog cache 55. Sector 210(5) is in position #5 of block 267(5) and it is backed by sector 144(18) (as indicated in the diagram by the S18 notation) of datalog cache 55. Sector 210(6) is in position #6 of block 267(5) and it is backed by sector 144(19) (as indicated in the diagram by the S19 notation) of datalog cache 55. Sector 210(7) is in position #7 of block 267(5) and it is backed by sector 144(21) (as indicated in the diagram by the S21 notation) of datalog cache 55. Sector 210(8) is in position #8 of block 267(5) and it is backed by sector 144(24) (as indicated in the diagram by the S24 notation) of datalog cache 55. Sector 210(9) is in position #9 of block 267(5) and it is backed by sector 144(9) (as indicated in the diagram by the S9 notation) of datalog cache 55. Sector 210(10) is in position #10 of block 267(5) and it is backed by sector 144(10) (as indicated in the diagram by the S10 notation) of datalog cache 55. Sector 210(11) is in position #11 of block 267(5) and it is backed by sector 144(11) (as indicated in the diagram by the S11 notation) of datalog cache 55. Sector 210(12) is in position #12 of block 267(5) and it is backed by sector 144(12) (as indicated in the diagram by the S12 notation) of datalog cache 55. Sector 210(13) is in position #13 of block 267(5) and it is backed by sector 144(25) (as indicated in the diagram by the S25 notation) of datalog cache 55. Sector 210(14) is in position #14 of block 267(5) and it is backed by sector 144(14) (as indicated in the diagram by the S14 notation) of datalog cache 55. Sector 210(15) is in position #15 of block 267(5) and it is backed by sector 144(15) (as indicated in the diagram by the S15 notation) of datalog cache 55.

As can be seen, contiguous sectors 210 on block 267(5) are not all backed by contiguous sectors 144 in datalog cache 55. This may be explained by the order in which the sectors 210 were written and overwritten.

For example, the arrangement 200 of FIG. 3 can be explained by block 267(5) originally having been written to as a complete block and stored in datalog cache 55, and then having had specific sectors 210 been overwritten.

Datalog cache 55 is arranged as a set of datalog segments 202 (depicted as datalog segments 202(a), 202(b), ... ) and a metadata portion 204. Each datalog segment 202, as depicted, is 64 kilobytes in length, storing 128 sectors 144 (for example, datalog segment 202(a) stores sectors 144(0)-144(127)). Metadata 204 includes information that allows each sector 144 to mapped to a location on a LUN 64. Generally, all new writes to any LUN 64 are originally written sequentially, sector-by-sector, to sectors 144 within datalog cache 55. If any sector 210 of LUN 64 is overwritten, a new sector 144 is written, but the old sector 144 remains in datalog cache. However, metadata 204 is updated to invalidate the old backing sector 144.

Thus, data of sector 210(0) (as depicted by the notation D0) was originally written to backing sector 144(0) of datalog cache 55. Similarly, data of sector 210(1) (as depicted by the notation D1) was originally written to backing sector 144(1) of datalog cache 55. Similarly, data of sectors 210(2)-210(15) (as depicted by the notations D2-D15) was originally written to backing sectors 144(2)-133(15) of datalog cache 55, respectively. This represents the state after the initial write of block 267(5) to datalog cache 55.

Subsequently, a new write was performed on sectors 210(3)-210(7), upon which new data D3' then in sector 210(3) was written to backing sector 144(16), new data D4' then in sector 210(4) was written to backing sector 144(17), new data D5' then in sector 210(5) was written to backing sector 144(18), new data D6' then in sector 210(6) was written to backing sector 144(19), and new data D7' then in sector 210(7) was written to backing sector 144(20).

Subsequently, another new write was performed on sectors 210(7)-210(8), upon which new data D7" then in sector 210(7) was written to backing sector 144(21) and new data D8' then in sector 210(8) was written to backing sector 144(22).

Subsequently, another new write was performed on sector 210(4), upon which new data D4" then in sector 210(4) was written to backing sector 144(23).

Subsequently, another new write was performed on sector 210(8), upon which new data D8" then in sector 210(8) was written to backing sector 144(24).

Subsequently, another new write was performed on sector 210(13), upon which new data D13' then in sector 210(13) was written to backing sector 144(25).

As a result, blocks 267 are now made up of several extents 212, each of which is backed by contiguous regions of datalog 55 (or persistent storage 44). Thus, block 267(5) is made up of extents 212(a), 212(b), 212(c), 212(d), 212(e), 212(e), 212(f), 212(g) 212(h), and 212(i), while blocks 267(6)-267(7) are both on a single extent 212(j).

When a read IOD 76 comes down to the I/O Coordination module 56 for sub-portion 66(a), I/O Coordination module 56 obtains all this mapping information 79 from container filesystem manager 58 (see FIG. 1), and creates a SIOTS 220 for each extent 212.

Thus, SIOTS 220(a) for extent 212(a) has a start value 222(a) of backing sector 144(0) and a length of 3 sectors 144. SIOTS 220(b) for extent 212(b) has a start value 222(b) of backing sector 144(16) and a length of 1 sector 144. SIOTS 220(c) for extent 212(c) has a start value 222(c) of backing sector 144(23) and a length of 1 sector 144. SIOTS 220(d) for extent 212(d) has a start value 222(d) of backing sector 144(18) and a length of 2 sectors 144. SIOTS 220(e) for extent 212(e) has a start value 222(e) of backing sector 144(21) and a length of 1 sector 144. SIOTS 220(f) for extent 212(f) has a start value 222(f) of backing sector 144(24) and a length of 1 sector 144. SIOTS 220(g) for extent 212(g) has a start value 222(g) of backing sector 144(9) and a length of 4 sectors 144. Additional SIOTSes 220 for extents 212(h)-212(j) are not depicted. It should be understood that each SIOTS 220 may also contain additional data, although that is beyond the scope of this Description. Thus, it is apparent that there may be many SIOTSes 220 needed per block 67, 267 of target portion 65 of any given I/O command 70 (particularly a write). In order to avoid needing more than the 8,192 SIOTSes 220 provisioned within memory 40 for a large write command 70, all read and write I/O commands are partitioned into several IODs 76 each having a respective sub-portion 66 with a size of no more than 4 megabytes.

Figure 4A:
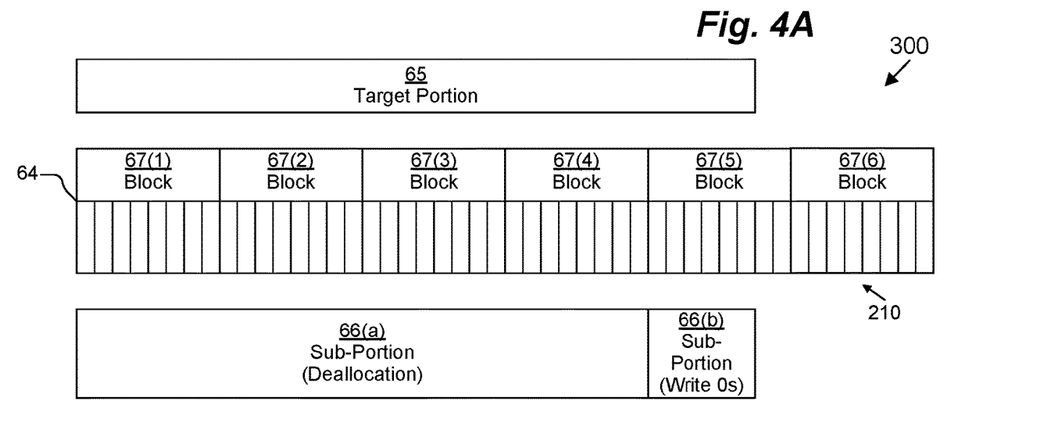
FIGS. 4A-4C are block diagrams depicting example relationships between data structures for use in connection with various embodiments in three different example scenarios.
Figure 4B:
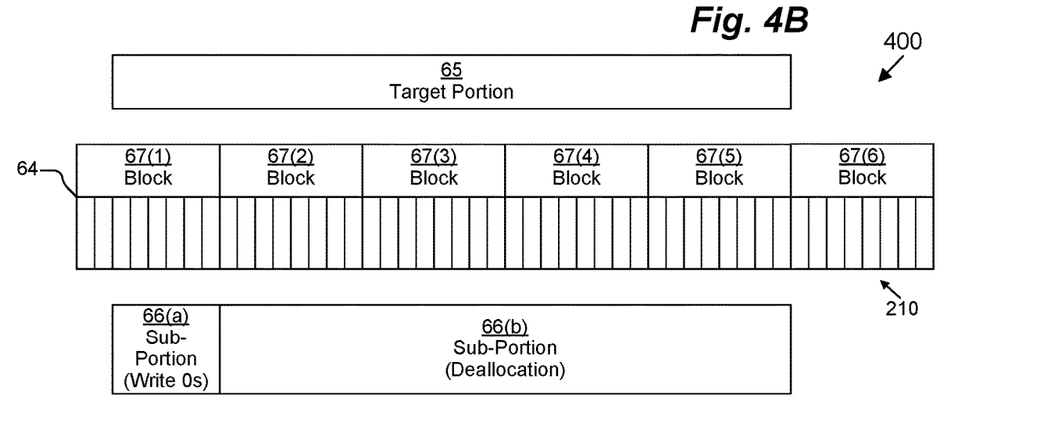
Figure 4C:
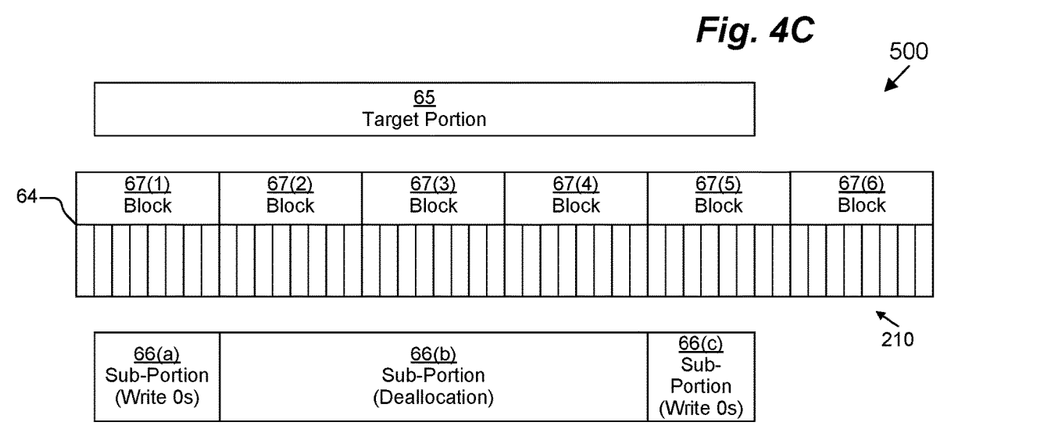

FIGS. 4A, 4B, and 4C depict example arrangements 300, 400, 500, respectively, in which I/O command 70 (see FIG. 1) is a misaligned zero-fill command. A zero-fill command directs the mapping driver 50 to cause a target portion 65 of LUN 64 to be entirely filled with zeroes (i.e., target portion 65 is erased).

In FIG. 4A, the target portion 65 identified by the zero-fill command is misaligned only at the end. Thus, although the beginning of target portion 65 is aligned to the beginning boundary of block 67(1) on LUN 64, the end of target portion 65 is not aligned to the boundary of any block 67.

Rather, the end of target portion 65 is in the middle of block 67(5). In the embodiments of FIGS. 4A-4C, although a block 67 typically contains sixteen sectors 210, for simplicity of illustration there are eight sectors 210 depicted per block 67. Thus, in arrangement 300 of FIG. 4A, the end of target portion 65 is at the end of the sixth sector 210 of block 67(5).

In arrangement 300, upon receiving the zero-fill I/O command 70, upper arm 51 divides the zero-fill into two IODs 76 (see FIG. 1) for fulfillment. IOD 76(a) is targeted at sub-portion 66(a) (made up of blocks 67(1)-67(4), all of which are entirely within the target portion 65), and it is a deallocation operation. Thus, blocks 67(1)-67(4) will be deallocated, meaning that they will no longer have any backing store whether on persistent storage 44 or in datalog cache 55.

IOD 76(b) is targeted at sub-portion 66(b) (made up of the first six sectors 210 of block 67(5), since block 67(5) is not entirely within the target portion 65), and it is a write operation to write zeroes to all bytes of the six sectors 210 of sub-portion 66(b).

In FIG. 4B, the target portion 65 identified by the zero-fill command is misaligned only at the beginning. Thus, although the end of target portion 65 is aligned to the end boundary of block 67(5) on LUN 64, the beginning of target portion 65 is not aligned to the boundary of any block 67. Rather, the beginning of target portion 65 is in the middle of block 67(1). In particular, the beginning of target portion 65 is at the beginning of the third sector 210 of block 67(1).

In arrangement 400, upon receiving the zero-fill I/O command 70, upper arm 51 divides the zero-fill into two IODs 76 (see FIG. 1) for fulfillment. IOD 76(a) is targeted at sub-portion 66(a) (made up of the last six sectors 210 of block 67(1), since block 67(1) is not entirely within the target portion 65), and it is a write operation to write zeroes to all bytes of the six sectors 210 of sub-portion 66(a).

IOD 76(b) is targeted at sub-portion 66(b) (made up of blocks 67(2)-67(5), all of which are entirely within the target portion 65), and it is a deallocation operation. Thus, blocks 67(2)-67(5) will be deallocated, meaning that they will no longer have any backing store whether on persistent storage 44 or in datalog cache 55.

In FIG. 4C, the target portion 65 identified by the zero-fill command is misaligned at both the beginning and the end. Thus, neither the beginning nor the end of target portion 65 is aligned to the boundary of any block 67 on LUN 64. Rather, the beginning of target portion 65 is in the middle of block 67(1), and the end of target portion 65 is in the middle of block 67(5). In particular, the beginning of target portion 65 is at the beginning of the second sector 210 of block 67(1), and the end of target portion 65 is at the end of the sixth sector 210 of block 67(5).

In arrangement 500, upon receiving the zero-fill I/O command 70, upper arm 51 divides the zero-fill into three IODs 76 (see FIG. 1) for fulfillment. IOD 76(a) is targeted at sub-portion 66(a) (made up of the last seven sectors 210 of block 67(1), since block 67(1) is not entirely within the target portion 65), and it is a write operation to write zeroes to all bytes of the seven sectors 210 of sub-portion 66(a).

IOD 76(b) is targeted at sub-portion 66(b) (made up of blocks 67(2)-67(4), all of which are entirely within the target portion 65), and it is a deallocation operation. Thus, blocks 67(2)-67(4) will be deallocated, meaning that they will no longer have any backing store whether on persistent storage 44 or in datalog cache 55.

Third IOD 76(n) is targeted at sub-portion 66(c) (made up of the first six sectors 210 of block 67(5), since block 67(5) is not entirely within the target portion 65), and it is a write operation to write zeroes to all bytes of the six sectors 210 of sub-portion 66(b).

Figure 5:
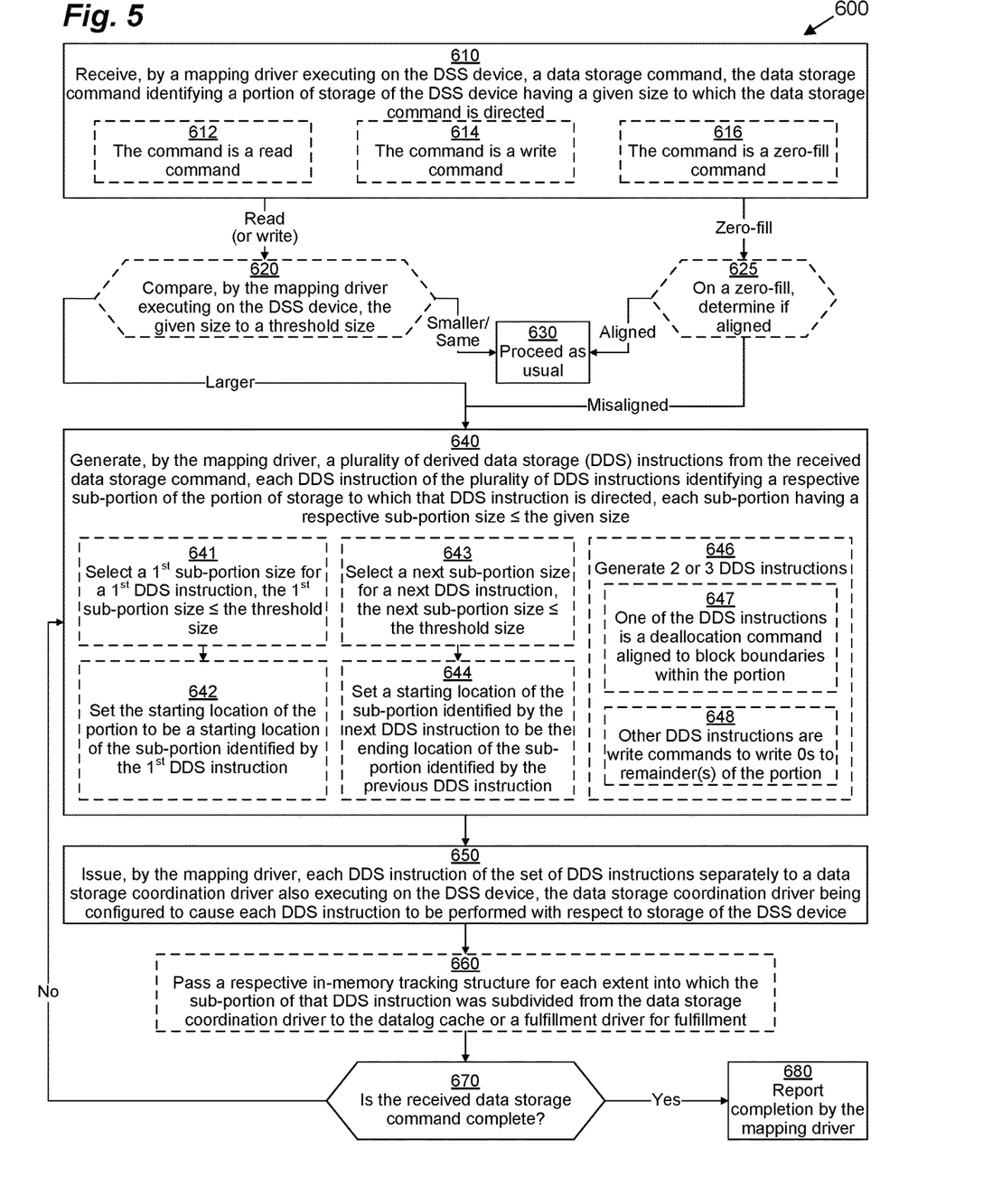
FIG. 5 is a flowchart depicting example methods of various embodiments.

FIG. 5 illustrates an example method 600 performed by DSS computing device 32. It should be understood that any time a piece of software (e.g., drivers 51, 54 or their components; fixtures 61; I/O Coordination module 56; container filesystem manager 58; etc.) is described as performing a method, process, step, or function, in actuality what is meant is that the computing device 32 on which that piece of software is running performs the method, process, step, or function when executing that piece of software on its processing circuitry 38.

It should be understood that, within FIG. 5, certain steps and sub-steps are drawn with a dashed border because they may be considered optional, depending on the embodiment, or they may represent various alternative scenarios in which method 600 may be employed. In addition, one or more of the other steps or sub-steps of method 600 may also be omitted in some embodiments. Similarly, in some embodiments, one or more steps or sub-steps may be combined together or performed in a different order. Method 600 is performed by DSS computing device 32.

In step 610, mapping driver 50 receives a data storage command 70, the data storage command 70 identifying a target portion 65 of storage (e.g., LUN 64) of the DSS computing device 32 having a given size to which the data storage command 70 is directed. In some embodiments, in sub-step 612, the data storage command 70 may be a read command. In some embodiments, in sub-step 614, the data storage command 70 may be a write command. In some embodiments, in sub-step 616, the data storage command 70 may be a zero-fill command.

In an arrangement in which the data storage command 70 is a read (sub-step 612) or write (sub-step 614) command, operation proceeds with step 620. In step 620, upper arm 51 of mapping driver 50 compares the given size of the target portion 65 to the threshold size 53 (see FIG. 1). If the given size of the target portion 65 is less than or equal to the threshold size 53, then operation proceeds with step 630, in which the data storage command 70 is processed normally, as is well-known in the art.

If the given size of the target portion 65 is greater than the threshold size 53, then operation proceeds with step 640.

In an arrangement in which the data storage command 70 is a zero-fill command (sub-step 616), after step 610 operation proceeds with step 625. In step 625, upper arm 51 of mapping driver 50 determines if the target portion 65 is aligned on both ends to block boundaries of the LUN 64 (see FIG. 1). If the target portion 65 is aligned on both ends to block boundaries of the LUN 64, then operation proceeds with step 630, in which the data storage command 70 is processed normally, as is well-known in the art.

If the target portion 65 is misaligned, then operation proceeds with step 640.

In step 640, the upper arm 51 generates a plurality of derived data storage (DDS) instructions (e.g., IODs 76) from the received data storage command 70, each DDS instruction 76 of the plurality of DDS instructions 76 identifying a respective sub-portion 66 of the portion 65 of storage to which that DDS instruction 76 is directed, each sub-portion 66 having a respective sub-portion size that is less than the given size of the target portion 65.

In an arrangement in which the data storage command 70 is a read (sub-step 612) or write (sub-step 614) command, each sub-portion 66 has a respective sub-portion size that is also less than or equal to the threshold size 53. In these arrangements, sub-steps 641-644 may be performed.

In some embodiments, sub-steps 641-642 are performed initially, followed by steps 650-670, after which, when execution returns to step 640, sub-steps 643-644 are performed instead. During any subsequent return to step 640 (following subsequent returns to step 670), sub-steps 643-644 are repeated.

In other embodiments, sub-steps 643-644 are performed repeatedly after sub-steps 641-642 during the initial execution of step 640. In these embodiments, operation returns to step 650 after step 670 rather than to step 640.

In sub-step 641, upper arm 51 selects a size 126(*a*) (see FIG. 2) of a first sub-portion 66(*a*) for a first DDS instruction 76(*a*) (this size 126(*a*) may either be inserted directly into an IOTS 77(*a*) for the IOD 76(*a*) or it may be inserted elsewhere within the IOD 76(*a*) to be inserted into the IOTS 77(*a*) by the I/O Coordination module 56 later), the size 126(*a*) of the first sub-portion 66(*a*) being less than or equal to the threshold size 53. In some embodiments, the size 126(*a*) of the first sub-portion 66(*a*) is always equal to the threshold size 53, but, in other embodiments, the threshold size 53 may exceed the size 126(*a*) of the first sub-portion 66(*a*) for various reasons (e.g., if data of the first portion 66(*a*) is not aligned to 64-kilobyte boundaries of the datalog cache 55, then, the threshold size 53 may exceed the size 126(*a*) of the first sub-portion 66(*a*) by one sector 144 less than the size of a datalog segment 202, e.g., by 63.5 kilobytes). There may also be other reasons to keep the size 126(*a*) of the first sub-portion 66(*a*) smaller than the threshold size 53.

In sub-step 642, upper arm 51 sets the starting location of the portion 65 on LUN 64 to also be the starting location (e.g., target address 124(*a*), see FIG. 2) of the sub-portion 66(*a*) identified by the first DDS instruction 76(*a*). This target address 124(*a*) may either be inserted directly into an IOTS 77(*a*) for the IOD 76(*a*) or it may be inserted elsewhere within the IOD 76(*a*) to be inserted into the IOTS 77(*a*) by the I/O Coordination module 56 later.

Although sub-step 642 is depicted as following sub-step 641, these sub-steps 641, 642 may be performed in parallel. In some embodiments, operation proceeds with step 650 after sub-step 642. In other embodiments, operation proceeds with sub-step 643.

In sub-step 643, upper arm 51 selects a size 126(X) (see FIG. 2) of a next sub-portion 66(X) (iterating from the previous one) for a next DDS instruction 76(X) (this size 126(X) may either be inserted directly into an IOTS 77(X) for the IOD 76(X) or it may be inserted elsewhere within the IOD 76(X) to be inserted into the IOTS 77(X) by the I/O Coordination module 56 later), the size 126(X) of the next sub-portion 66(X) being less than or equal to the threshold size 53. In some embodiments, the size 126(X) of the next sub-portion 66(X) is always equal to the threshold size 53 unless the end of the target portion 65 has been reached, but, in other embodiments, the threshold size 53 may exceed the size 126(X) of the next sub-portion 66(X) for various reasons.

In sub-step 644, upper arm 51 sets the starting location (e.g., target address 124(X), see FIG. 2) of the sub-portion 66(X) identified by the next DDS instruction 76(X) to be the ending location of the sub-portion 66(X−1) identified by the previous DDS instruction 76(X−1). This target address 124(X) may either be inserted directly into an IOTS 77(X) for the IOD 76(X) or it may be inserted elsewhere within the IOD 76(X) to be inserted into the IOTS 77(X) by the I/O Coordination module 56 later.

Although sub-step 644 is depicted as following sub-step 643, these sub-steps 643, 644 may be performed in parallel. In some embodiments, operation proceeds with sub-step 643 again after sub-step 644. In other embodiments, operation proceeds with step 650 after sub-step 644.

In an arrangement in which the data storage command 70 is a zero-fill command (sub-step 616), it is possible for one of the sub-portions 66 to have a sub-portion size that is exceeds the threshold size 53. In these arrangements, sub-step 646 may be performed.

In sub-step 646, upper arm 51 generates either two or three DDS instructions (e.g., IOD 76(*a*), 76(*b*), and possibly 76(*n*)). Sub-step 646 may include two sub-sub-steps 647, 648.

In sub-sub-step 647, upper arm 51 generates one DDS instruction (i.e., either 76(*a*) or 76(*b*), depending whether it is in an arrangement similar to arrangement 300 or to arrangements 400, 500) to be a deallocation instruction whose respective sub-portion 66 (either 66(*a*) in arrangement 300 or 66(*b*) in arrangements 300, 400) is aligned to block boundaries of the LUN 64. All blocks 67 of the target portion 65 which are entirely within the target portion 65 are placed within this the sub-portion 66(*a*), 66(*b*) of this deallocation instruction.

In sub-sub-step 648, upper arm 51 generates one or two additional DDS instructions (i.e., 76(*b*), 76(*a*), or 76(*a*) and 76(*n*), depending whether it is in an arrangement similar to arrangement 300, 400, or 500, respectively) to be write instructions to write zeroes to the remainder(s) of the portion 65 outside of the sub-portion 66 generated in sub-sub-step 647. The respective sub-portions 66 (either 66(*b*) in arrangement 300, 66(*a*) in arrangement 400, or both 66(*a*) and 66(*c*) in arrangement 500) are not aligned on one end to block boundaries of the LUN 64. All sectors 210 of the target portion 65 which are in blocks 67 of the target portion 65 which are not entirely within the target portion 65 are placed within the sub-portion(s) 66 of the write instruction(s) generated in sub-sub-step 648.

Following step 646, operation proceeds with step 650

In step 650, upper arm 50 of mapping driver 51 issues each DDS instruction 76 separately to a data storage coordination driver (e.g., I/O coordination module 56) also executing on the DSS computing device 32, the data storage coordination driver 56 being configured to cause each DDS instruction 76 to be performed with respect to storage (e.g., persistent storage 44 or datalog cache 55 of memory 40) of the DSS computing device 32. In some embodiments, step 650 proceeds repeatedly after each DDS instruction 76 is generated in step 640. In other embodiments, after all DDS instructions 76 are generated in step 640, operation proceeds with step 650, in which upper arm 50 separately issues each DDS instruction 76 (either in series, or in parallel, ensuring that no more than a small number, e.g., 2, are executed at once).

After issuing each DDS instruction 76(X) to the I/O coordination module 56, that DDS instruction 76(X) passes down the fixture stack 60 until it reaches the I/O coordination module 56, at which point, I/O coordination module 56 performs mapping operations (e.g., issuing Map_for_Write command 78 or Map_for_Deallocate command 91 and receiving a respective response 79, 92).

Then, in the case of a read or write DDS instruction 76(X), in response to the Map_for_Write command 78 and response 92, a SIOTS 220 is created for each mapped extent 212, and I/O coordination module 56 performs step 660. In step 660, I/O coordination module 56 passes a respective in-memory tracking structure (e.g., a SIOTS 220) for each extent 212 into which the sub-portion 66(X) of that DDS instruction 76(X) was subdivided from the data storage coordination driver 56 to a fulfillment driver (e.g., physical storage driver 54) for fulfillment. This step 660 may involve sending instructions 80, 81, 82 or 80, 81, 84 down the stack 46, as described above in connection with FIG. 1.

Then, upon completion of all instructions 80 for the SIOTS 220 for each extent 212, as evidenced by receipt of a response 87 for each one, I/O Coordination module 56 sends a completion signal 89 up the fixture stack 60 back to upper arm 50.

Upon receiving a completion signal 89, upper arm 50 of mapping driver 51 performs step 670. In step 670, upper arm 50 of mapping driver 51 determines whether the received data storage command 70 has been completed. If the set of IODs 76 (and their respective sub-portions 66) has not yet been completely generated in step 640, then operation proceeds back to step 640. If there is still a sub-portion 66(X) left for which a respective IOD 76(X) has not yet been issued (step 640) and completed, then operation proceeds back to step 650. Otherwise, operation may proceed with step 680, in which mapping driver 51 reports completion. In some embodiments, step 680 may involve sending a completion signal 90 back to the host 31 or originating driver.

Thus, techniques have been presented for implementing a DSS device 32 that is able to accept any sized I/O regardless of its size and regardless of the number of SIOTSes 220 provisioned by the DSS device 32 within memory 40. This may be accomplished by configuring a mapping driver 51 of the DSS device 32 to split up incoming I/O commands 70 into smaller constituent parts (e.g., a plurality of IODs 76), and only internally issue the smaller constituent parts 76 for fulfillment using the SIOTSes 220. Thus, a large I/O command 70 may be processed internally as several smaller I/Os (each having its own IOD 76), none of which will individually exceed use of the fixed number of SIOTSes 220. If these IODs 76 are processed sequentially (or with only a predetermined maximum number at once in parallel), any indefinitely large I/O command 70 can be processed without exceeding the fixed number of SIOTSes needed. Advantageously, no maximum I/O size is needed due to a DSS device 32 having only a fixed number of provisioned SIOTSes. In addition, these techniques can also be used to enhance operation of misaligned zero-fill commands targeted at thinly-provisioned logical disks 64 by breaking up any misaligned zero-fill command into only two or three smaller operations 76, including an efficient deallocation of the aligned portion of the zero-fill command.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

It should be understood that all embodiments that have been described may be combined in all possible combinations with each other, except to the extent that such combinations have been explicitly excluded.

Finally, even if a technique, method, apparatus, or other concept is specifically labeled as "background" or "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method performed by a data storage system (DSS) device, the method comprising:
    receiving, by a mapping driver executing on the DSS device, a data storage command, the data storage command identifying a portion of storage of the DSS device having a given size to which the data storage command is directed;
    comparing, by the mapping driver executing on the DSS device, the given size to a threshold size;
    determining, by the mapping driver executing on the DSS device, that the given size exceeds the threshold size;
    in response to determining that the given size exceeds the threshold size, generating, by the mapping driver executing on the DSS device, a plurality of derived data storage instructions from the received data storage command, each derived data storage instruction of the plurality of derived data storage instructions identifying a respective sub-portion of the portion of storage to which that derived data storage instruction is directed, each sub-portion having a respective sub-portion size smaller than the given size, wherein generating the plurality of derived data storage instructions includes:
        selecting a first sub-portion size for a first derived data storage instruction, the first sub-portion size being less than or equal to the threshold size; and
        setting a starting location of the portion identified by the received data storage command to be a starting location of the sub-portion identified by the first derived data storage instruction, the starting location of the sub-portion identified by the first derived data storage instruction and the first sub-portion size defining an ending location of the sub-portion identified by the first derived data storage instruction; and
    issuing, by the mapping driver executing on the DSS device, each derived data storage instruction of the set of derived data storage instructions separately to a data storage coordination driver also executing on the DSS device, the data storage coordination driver being configured to cause each derived data storage instruction to be performed with respect to storage of the DSS device;
    wherein generating the plurality of derived data storage instructions further includes, after receiving, by the mapping driver executing on the DSS device, feedback indicating that the first derived data storage instruction has completed:
        selecting a second sub-portion size for a second derived data storage instruction, the second sub-portion size being less than or equal to the threshold size; and
        setting a starting location of the sub-portion identified by the second derived data storage instruction to be the ending location of the sub-portion identified by the first derived data storage instruction, the starting location of the sub-portion identified by the second derived data storage instruction and the second sub-portion size defining an ending location of the sub-portion identified by the second derived data storage instruction.

2. The method of claim 1 wherein the threshold size is defined by a product of:
   a number of in-memory tracking structures allocated by the DSS device; and
   a size of an addressable sector of the DSS device.

3. The method of claim 2 wherein:
   the number of in-memory tracking structures allocated by the DSS device is 8192;
   the size of an addressable sector of the DSS device is 512 bytes; and
   the threshold size is 4 megabytes.

4. The method of claim 1 wherein:
   the received data storage command is a read command to read the identified portion of storage starting at a starting address of a logical disk for a number of bytes defined by the given size;
   the logical disk is backed by backing store;
   the DSS device includes a datalog cache having a sector-level granularity, the datalog cache providing temporary backing store for recently-updated portions of the logical disk; and
   the sub-portion of each respective derived data storage instruction may be further subdivided into extents that each represent contiguous sectors of that derived data storage instruction that are backed by contiguous sectors in the datalog, each extent being identified by a respective in-memory tracking structure.

5. The method of claim 4 wherein the method further comprises, in response to the mapping driver issuing each derived data storage instruction separately to the data storage coordination driver, passing the respective in-memory tracking structure for each extent into which the sub-portion of that derived data storage instruction was subdivided from the data storage coordination driver to the datalog cache for fulfillment.

6. The method of claim 1 wherein the threshold size is 4 megabytes.

7. An apparatus comprising:
   persistent data storage devices that provide backing store for a set of logical disks of storage (LUNs); and
   processing circuitry coupled to memory configured to:
      receive, by a mapping driver executing on the processing circuitry, a data storage command, the data storage command identifying a portion of a LUN of the set of LUNS, the portion having a given size to which the data storage command is directed;
      generate, by the mapping driver executing on the processing circuitry, a plurality of derived data storage instructions from the received data storage command, each derived data storage instruction of the plurality of derived data storage instructions identifying a respective sub-portion of the portion of the LUN to which that derived data storage instruction is directed, each sub-portion having a respective sub-portion size smaller than the given size; and
      issue, by the mapping driver executing on the processing circuitry, each derived data storage instruction of the set of derived data storage instructions separately to a data storage coordination driver also executing on the processing circuitry, the data storage coordination driver being configured to cause each derived data storage instruction to be performed with respect to storage underlying the LUN;

wherein:
   the received data storage command is a misaligned zero-fill operation, the misaligned zero-fill operation directing that the identified portion of storage starting at a starting address on a thinly-provisioned logical disk and continuing for a number of bytes defined by the given size be filled with zeroes;
   the thinly-provisioned logical disk is backed by backing store;
   one of the starting address and an ending address of the identified portion is misaligned with a block boundary of the logical disk;
   a first derived data storage instruction of the plurality of derived data storage instructions is a write instruction to write zeroes to a sub-portion identified by the first derived data storage instruction, the sub-portion identified by the first derived data storage instruction including one misaligned block boundary and one aligned block boundary; and
   a second derived data storage instruction of the plurality of derived data storage instructions is a deallocation instruction to deallocate backing store from a set of blocks of the logical disk completely included within the identified portion of storage, the set of blocks not including the sub-portion identified by the first derived data storage instruction.

8. The apparatus of claim 7 wherein:
   the starting address of the identified portion is misaligned; and
   the sub-portion identified by the first derived data storage instruction starts at the starting address on the thinly-provisioned logical disk and continues until a next block boundary of the logical disk.

9. The apparatus of claim 8 wherein:
   the ending address of the identified portion is aligned; and
   the plurality of derived data storage instructions includes exactly two derived data storage instructions.

10. The apparatus of claim 8 wherein:
   the ending address of the identified portion is misaligned;
   a third derived data storage instruction of the plurality of derived data storage instructions is a write instruction to write zeroes to the sub-portion identified by the third derived data storage instruction, the sub-portion identified by the third derived data storage instruction starting at a block boundary of the logical disk and continuing until the ending address of the identified portion; and
   the plurality of derived data storage instructions includes exactly three derived data storage instructions.

11. The apparatus of claim 7 wherein:
   the starting address of the identified portion is aligned;
   the ending address of the identified portion is misaligned;
   a sub-portion identified by the second derived data storage instruction starts at the starting address on the thinly-provisioned logical disk and ends at a last block boundary of the logical disk within the identified portion;
   the sub-portion identified by the first derived data storage instruction starts at the last block boundary and continues until the ending address of the identified portion; and
   the plurality of derived data storage instructions includes exactly two derived data storage instructions.

12. A computer program product comprising a non-transitory computer-readable storage medium storing a set of instructions, which, when executed by a data storage system (DSS) computing device, causes the DSS computing device to execute a mapping driver to:

receive a data storage command, the data storage command identifying a portion of storage of the DSS computing device having a given size to which the data storage command is directed;

generate a plurality of derived data storage instructions from the received data storage command, each derived data storage instruction of the plurality of derived data storage instructions identifying a respective sub-portion of the portion of storage to which that derived data storage instruction is directed, each sub-portion having a respective sub-portion size smaller than the given size; and issue each derived data storage instruction of the set of derived data storage instructions separately to a data storage coordination driver also executing on the DSS computing device, the data storage coordination driver being configured to cause each derived data storage instruction to be performed with respect to storage of the DSS computing device;

wherein:

the received data storage command is a misaligned zero-fill operation, the misaligned zero-fill operation directing that the identified portion of storage starting at a starting address on a thinly-provisioned logical disk and continuing for a number of bytes defined by the given size be filled with zeroes;

the thinly-provisioned logical disk is backed by backing store;

one of the starting address and an ending address of the identified portion is misaligned with a block boundary of the logical disk;

a first derived data storage instruction of the plurality of derived data storage instructions is a write instruction to write zeroes to a sub-portion identified by the first derived data storage instruction, the sub-portion identified by the first derived data storage instruction including one misaligned block boundary and one aligned block boundary; and a second derived data storage instruction of the plurality of derived data storage instructions is a deallocation instruction to deallocate backing store from a set of blocks of the logical disk completely included within the identified portion of storage, the set of blocks not including the sub-portion identified by the first derived data storage instruction.

13. The computer program product of claim 12 wherein:
the starting address of the identified portion is misaligned; and
the sub-portion identified by the first derived data storage instruction starts at the starting address on the thinly-provisioned logical disk and continues until a next block boundary of the logical disk.

14. The computer program product of claim 13 wherein:
the ending address of the identified portion is aligned; and
the plurality of derived data storage instructions includes exactly two derived data storage instructions.

15. The computer program product of claim 12 wherein:
the starting address of the identified portion is aligned;
the ending address of the identified portion is misaligned;
a sub-portion identified by the second derived data storage instruction starts at the starting address on the thinly-provisioned logical disk and ends at a last block boundary of the logical disk within the identified portion;
the sub-portion identified by the first derived data storage instruction starts at the last block boundary and continues until the ending address of the identified portion; and the plurality of derived data storage instructions includes exactly two derived data storage instructions.

16. A method performed by a data storage system (DSS) device, the method comprising:

receiving, by a mapping driver executing on the DSS device, a data storage command, the data storage command identifying a portion of storage of the DSS device having a given size to which the data storage command is directed;

generating, by the mapping driver executing on the DSS device, a plurality of derived data storage instructions from the received data storage command, each derived data storage instruction of the plurality of derived data storage instructions identifying a respective sub-portion of the portion of storage to which that derived data storage instruction is directed, each sub-portion having a respective sub-portion size smaller than the given size; and issuing, by the mapping driver executing on the DSS device, each derived data storage instruction of the set of derived data storage instructions separately to a data storage coordination driver also executing on the DSS device, the data storage coordination driver being configured to cause each derived data storage instruction to be performed with respect to storage of the DSS device;

wherein:

the received data storage command is a misaligned zero-fill operation, the misaligned zero-fill operation directing that the identified portion of storage starting at a starting address on a thinly-provisioned logical disk and continuing for a number of bytes defined by the given size be filled with zeroes;

the thinly-provisioned logical disk is backed by backing store;

one of the starting address and an ending address of the identified portion is misaligned with a block boundary of the logical disk;

a first derived data storage instruction of the plurality of derived data storage instructions is a write instruction to write zeroes to a sub-portion identified by the first derived data storage instruction, the sub-portion identified by the first derived data storage instruction including one misaligned block boundary and one aligned block boundary; and a second derived data storage instruction of the plurality of derived data storage instructions is a deallocation instruction to deallocate backing store from a set of blocks of the logical disk completely included within the identified portion of storage, the set of blocks not including the sub-portion identified by the first derived data storage instruction.

17. The method of claim 16 wherein:
the starting address of the identified portion is misaligned; and
the sub-portion identified by the first derived data storage instruction starts at the starting address on the thinly-provisioned logical disk and continues until a next block boundary of the logical disk.

18. The method of claim 17 wherein:
the ending address of the identified portion is aligned; and
the plurality of derived data storage instructions includes exactly two derived data storage instructions.

19. The method of claim 17 wherein:
the ending address of the identified portion is misaligned;
a third derived data storage instruction of the plurality of derived data storage instructions is a write instruction to write zeroes to the sub-portion identified by the third derived data storage instruction, the sub-portion identified by the third derived data storage instruction starting at a block boundary of the logical disk and continuing until the ending address of the identified portion; and the plurality of derived data storage instructions includes exactly three derived data storage instructions.

20. The method of claim 16 wherein:

the starting address of the identified portion is aligned;

the ending address of the identified portion is misaligned;

a sub-portion identified by the second derived data storage instruction starts at the starting address on the thinly-provisioned logical disk and ends at a last block boundary of the logical disk within the identified portion;

the sub-portion identified by the first derived data storage instruction starts at the last block boundary and continues until the ending address of the identified portion; and the plurality of derived data storage instructions includes exactly two derived data storage instructions.

* * * * *